June 30, 1925.  
J. R. TOBIN ET AL  
INSECT GUARD AND MUZZLE  
Filed Oct. 14, 1924

1,543,960

Inventors  
John R. Tobin  
Charles J. Tobin.  
By  
Attorney

Patented June 30, 1925.

1,543,960

UNITED STATES PATENT OFFICE.

JOHN R. TOBIN AND CHARLES J. TOBIN, OF LANGFORD, SOUTH DAKOTA.

INSECT GUARD AND MUZZLE.

Application filed October 14, 1924. Serial No. 743,560.

*To all whom it may concern:*

Be it known that we, JOHN R. TOBIN and CHARLES J. TOBIN, citizens of the United States, residing at Langford, in the county of Marshall and State of South Dakota, have invented certain new and useful Improvements in Insect Guards and Muzzles; and we do hereby declare the following to be a full, clear, and exact description of the invention, such as will enable others skilled in the art to which it appertains to make and use the same.

This invention relates to new and useful improvements in guards and particularly to guards for use on animals, to prevent attacks of insects.

It is well known that, in the cases of draft animals, such as horses, mules, and the like, the gadfly lays its eggs in the creases of the upper lip of the animals from whence they pass into the mouth and are swallowed. The sting of these flies is also painful, and renders the animal difficult to manage. It is therefore the particular object of the present invention to provide a shield or guard, to be worn by the animal, especially while working, to protect the lips from the attacks of these flies.

Another object is to provide a device of this character which not only protects the animal from the attacks of insects, but one which will permit the animal to breathe freely.

A further object is to provide a device of this character which is adapted to cover the mouth of the animal, to prevent eating, while at work, and which has means for permitting the escape of saliva.

A still further object is to provide a device of this character which can be worn with comfort by the animal, and which will not rub or chafe the face.

Other objects and advantages will be apparent from the following description when taken in connection with the accompanying drawing.

Figure 1:
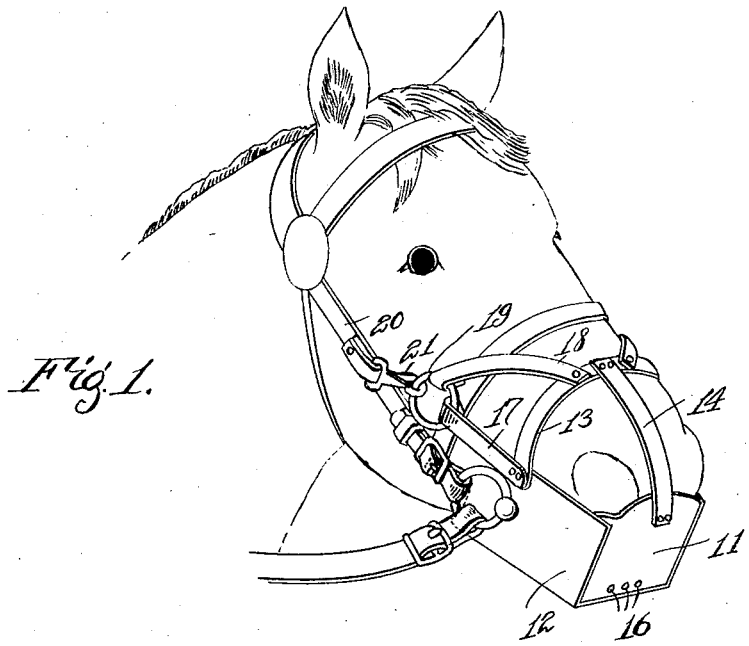
Figure 1 is a perspective view of the invention applied to a horse.
Figure 2:
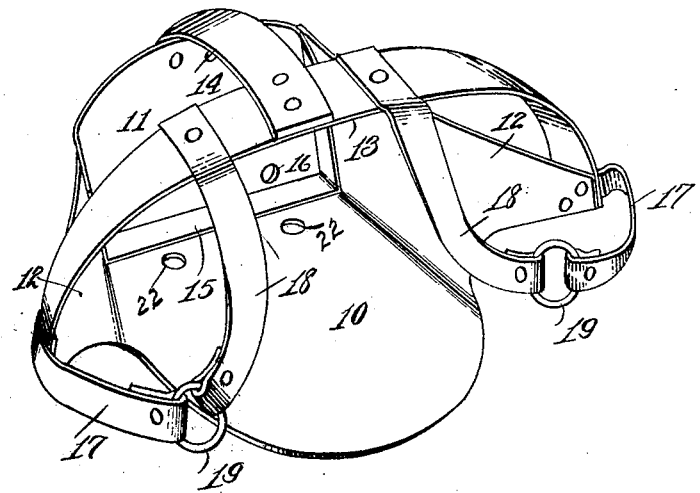
Figure 2 is a perspective view of the device removed from the horse, and showing the interior thereof.

Referring particularly to the accompanying drawing, the body of the device is formed from leather, canvas, rubber, or like soft and flexible material, and includes the bottom 10, the front wall 11, which is formed from stiff metal, and the side walls 12, the body being applied to the animal, as seen in Figure 1, with the bottom wall beneath the animal's chin, the front wall 11 in front of the animal's mouth, while the side walls are disposed at the sides of the animal's mouth, and extend to a sufficient height to protect the upper lip from attack of insects, but not high enough to prevent the proper breathing of the animal. Secured to the rear ends of the side walls 12, and extending upwardly over the animal's nose, behind the nostrils, is a strap 13, and secured to the center of the front wall 11, and extending upwardly on the animal's nose, where it is secured to the center of the strap 13, is a strap 14. Thus, between the straps 13 and 14, and the upper edge portions of the side walls 12, there are produced the openings for the nostrils of the animal, to permit free breathing. The front wall, which is preferably formed from stiff metal, extends upwardly to a sufficient height to prevent the animal eating, and has the vertical and lower horizontal edges formed with the rearwardly extending flanges 15, which are riveted to the front edge portions of the bottom and side walls 10 and 12. In the lower portion of the metal wall 11, immediately above the bottom wall 10, there are formed the row of openings 16, which permit escape of saliva from the mouth of the animal.

Carried by the ends of the strap 13 are the rearwardly extending straps 17, similar straps 18 being secured to the strap 13, at opposite sides of the strap 14, and also extending rearwardly, where they are connected with a ring 19, together with the rear ends of the straps 17. The rings 19 are connected with the halter 20, by means of the snap hooks 21 carried by the halter.

The particular advantage of the metal wall 11 resides in the fact that it maintains the device in proper shape, and prevents sagging of the leather portion when wet from saliva.

In the bottom wall 10, adjacent the front wall, there are formed the openings 22, which also serve as exits for the saliva.

What is claimed is:

A device for protecting the mouths of animals from attacks of insects including a single piece of flexible material having a bottom and imperforate side walls, and a rigid front wall meeting the side and bottom walls at approximately right angles and having a single horizontal line of saliva escape openings formed through and extending longitudinally of the lower portion thereof, said bottom wall having saliva escape openings adjacent the front wall.

In testimony whereof, we affix our signatures, in the presence of two witnesses.

JOHN R. TOBIN.
CHARLES J. TOBIN.

Witnesses:
HELMER NELSON,
THOMAS BRASSELL.